US009437024B2

(12) United States Patent
Krajec et al.

(10) Patent No.: US 9,437,024 B2
(45) Date of Patent: *Sep. 6, 2016

(54) TRANSFORMATION FUNCTION INSERTION FOR DYNAMICALLY DISPLAYED TRACER DATA

(71) Applicant: Microsoft Technology Licensing, LLC, Redmond, WA (US)

(72) Inventors: Russell S. Krajec, Loveland, CO (US); Alexander G. Gounares, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/995,872

(22) Filed: Jan. 14, 2016

(65) Prior Publication Data
US 2016/0133035 A1 May 12, 2016

Related U.S. Application Data

(63) Continuation of application No. 13/757,631, filed on Feb. 1, 2013, now Pat. No. 9,256,969.

(51) Int. Cl.
*G06T 11/20* (2006.01)

(52) U.S. Cl.
CPC .................................. *G06T 11/206* (2013.01)

(58) Field of Classification Search
None
See application file for complete search history.

*Primary Examiner* — David H Chu
(74) *Attorney, Agent, or Firm* — Ben Tabor; Raghu Chinagudabha; Micky Minhas

(57) ABSTRACT

A visualization system for a tracer may include a processing pipeline that may generate tracing data, preprocess the data, and visualize the data. The preprocessing step may include a mechanism to process user-defined expressions or other executable code. The executable code may perform various functions including mathematical, statistical, aggregation with other data, and others. The preprocessor may perform malware analysis, test the functionality, then implement the executable code. A user may be presented with an editor or other text based user interface component to enter and edit the executable code. The executable code may be saved and later recalled as a selectable transformation for use with other data streams.

20 Claims, 14 Drawing Sheets

TRANSFORMATION FUNCTION INSERTION FOR DYNAMICALLY DISPLAYED TRACER DATA

CROSS-REFERENCE TO RELATED APPLICATIONS

This application is a continuation of U.S. patent application Ser. No. 13/757,631 filed on Feb. 1, 2013 entitled "Transformation Function Insertion for Dynamically Displayed Tracer Data". This application expressly incorporates herein the entirety of the foregoing application.

BACKGROUND

Message passing computational environments operate by having independent processing elements, such as threads or other computational components, pass messages from one element to another during execution. The messages passed between components may contain data and other information that may be consumed by the recipient.

SUMMARY

A visualization system for a tracer may include a processing pipeline that may generate tracing data, preprocess the data, and visualize the data. The preprocessing step may include a mechanism to process user-defined expressions or other executable code. The executable code may perform various functions including mathematical, statistical, aggregation with other data, and others. The preprocessor may perform malware analysis, test the functionality, then implement the executable code. A user may be presented with an editor or other text based user interface component to enter and edit the executable code. The executable code may be saved and later recalled as a selectable transformation for use with other data streams.

A force directed graph may serve as a part of a user control for a tracer. The tracer may collect data while monitoring an executing application, then the data may be processed and displayed on a force directed graph. A user may be able to select individual nodes, edges, or other elements, then cause the tracer to change what data may be collected. The user may be able to select individual nodes, edges, or groups of elements on the graph, then perform updates to the tracer using the selected elements. The selection mechanisms may include clicking and dragging a window to select nodes that may be related, as well as selecting from a legend or other grouping.

A force directed graph may display time series data using a set of playback controls to pause, play, reverse, fast forward, slow down, or otherwise control the display of the time series data. The playback controls may be used in a real time or near real time application to which data sets are displayed and the speed with which the data sets may be displayed. In one architecture, the force directed graph may be deployed using a rendering engine that receives data and renders the data into a graph. A playback controller may send updates to the rendering engine according to user inputs from the playback controls.

A message passing compute environment may be visualized by illustrating messages passed within the environment. The messages may contain data consumed by a function or other computational element, and may be used to launch or spawn various computational elements. One visualization may be a force directed graph that has each function as a node, with messages passed as edges of the graph. In some embodiments, the edges may display the number of messages, quantity of data, or other metric by showing the edges as wider or thinner, or by changing the color of the displayed edge. The nodes may be illustrated with different colors, size, or shape to show different aspects. Some embodiments may have a mechanism for storing and playing back changes to the graph over time.

A force directed graph may display recent activities of a message passing system as highlighted features over a larger graph. The force directed graph may display a superset of nodes and edges representing processes and message routes, then display recent activities as highlighted elements within the larger superset. The highlighted elements may display messages passed or computation performed during a recent time element of a time series. In some embodiments, the effects of activities may be displayed by decaying the highlighted visual elements over time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
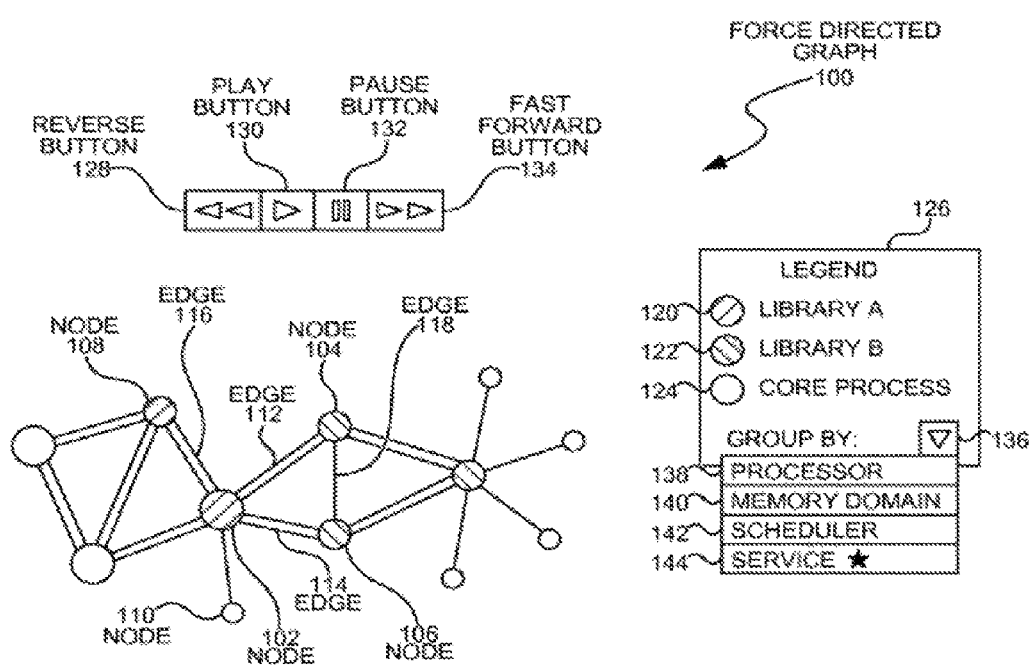
FIG. 1 is a diagram illustration of an embodiment showing a force directed graph.

Graphs for Visualizing a Message Passing Compute Environment

A message passing compute environment may be visualized by showing graphs of the messages passed between compute elements. The graphs may show the compute elements as nodes, with messages as edges of the graph. One type of such a visualization may be a force directed graph.

The visualization may illustrate different features of the data, such as the number of messages, quantity of data, direction of messages, or other features as line widths, colors, or other visual elements. In the case of a force directed graph, the forces between elements may represent such data features.

The nodes of a graph may represent compute elements. The compute elements may be any executable code, device, or other element that may send or receive a message. The nodes may be illustrated with different sizes, colors, shapes, or other features to illustrate the amount of computational time consumed, frequency of calling, membership in a group, interaction with other elements, or other data items.

The visualization may be performed using a sequence of data sets, where each data set may be collected over time. In such embodiments, a graph may expand, contract, and change shape as an application executes. Such embodiments may be capable of storing and playing back the sequence of data sets. In some cases, such playback may be slowed down or sped up to illustrate changes during execution.

The visualization system may have an instrumentation system that gathers message information during execution, then processes or formats the information for display. The display system may generate the graphs and display the graphs for a user. In some cases, the graphs may be interactive, where the user may be able to probe the graphs to gain additional insight. In one example, a user may be able to click on a node to find details about the node, such as the node name, performance metrics regarding the node, or other information.

The visualization system may be used to monitor and display messages passed within a single device, as well as embodiments where messages are passed between devices. For example, some functional languages may pass messages between processes that may execute on a single processor or across several processors within a single device. In another example, a high performance computing system may combine processors located on many different devices to execute a large application. Such an application may be visualized by showing all of the messages passed from device to device, as well as from one process to another within each individual devices, for example.

Force Directed Graph for Time Series Data with Highlighting

A force directed graph may display time series data by maintaining a superset of nodes and edges, and displaying recent activity by highlighting those elements within the graph representing the recent activity. The superset of nodes and edges may be created by capturing each node and edge that may be defined through the time series and maintaining the superset during playback or display of a time series.

Recent activity may be overlaid on the superset of elements by highlighting those elements that represent the activity, while showing at least some of the superset of nodes and edges in a non-highlighted fashion. In one style of such a visualization, the superset of nodes and edges may be presented in a greyed-out fashion while recently active nodes and edges may be presented in a colored manner.

The recent activity may be illustrated as fading or dissolving by causing an element to decrease in highlighting for successive time periods after being active. Such a visual decay may highlight an active element yet keep a visual cue for a certain number of time slices, and may be useful in cases where the time slices are short enough that activity in a single time slice may not be fully comprehended.

Visualization of Time Series Data with Force Directed Graph

A dynamic visualization of time series data may be rendered in a force directed graph. The time series data may include data sets that represent a state of a system at any given time. The visualization may illustrate the state changes as time progresses.

The visualization may have a set of controls that allow a user to move forward and backwards through the data sets. The controls may allow the user to control playback of the data. In some cases, the data may be presented in a normal-time basis where the playback may correspond with the speed of the data collection. In other cases, the playback may be sped up or slowed down with respect to the periodicity in which the data were collected.

An architecture for a visualization system may have a visualizer that may be bound to a data source. The visualizer may display the force directed graph, including rendering any animated motion of the forces. The controls may configure a data browser that may select the data sets to present, which may be transferred to the visualizer through a data binding. In some cases, the visualizer may collect user input that may be processed by a remote device on which the data browser may operate.

Force Directed Graph as Input Mechanism for Tracer

A tracer may use a force directed graph as an input mechanism. The force directed graph may allow a user to select and manipulate nodes and edges of the graph, which may represent various elements of an application. Once selected, the user may be able to apply various actions to the elements, such as causing additional tracing to be applied to the elements or to related elements.

A force directed graph or other visualization may present application elements in different groupings or presentations, which may help a user see relationships within the elements. By using a force directed graph or other visualization as an input to the tracer, a user may be able to easily select elements and related elements that would otherwise be difficult to select.

The graph may contain a legend that may show groups of elements. The legend may include hot spots or other user interface controls with which a user may select a subset of the elements.

The user interface may include an additional menu of options that may use the selected elements as input. The additional menu may include various actions that may be taken by the tracer supplying the displayed data. A configuration file may be updated and sent to the tracer to change the tracer behavior.

Transformation Definition for Trace Data

Trace data may be prepared for display by applying predefined or user-defined transformations. A visualization of the data may include a user interface through which a user may select one or more predefined transformations or enter executable code or expressions that may create a new transformation.

The user-entered expression may define changes that may be applied to data in preparation for visualization. The changes may perform statistical analysis, apply arithmetic functions, combine data fields, merge external data, or other functions. The expressions may allow a user to create transformations that address specific scenarios that may not be envisioned when a visualization may be created.

The expression may be inserted into a data processing pipeline for a data feed. In some cases, the data processing pipeline may be a real time pipeline that may receive, process, and display real time data.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing an example force directed graph. Embodiment 100 is an example of a force directed graph that may show objects in a message passing relationship with each other, as well as various controls that may be used to view the graph with a sequence of data sets.

The force directed graph of embodiment 100 may illustrate messages passed within a message passing environment. As an example of such an environment, independent compute elements may process portions of an application. During processing, each compute element may pass messages to another compute element that contain data, instructions, or other elements. In such environments, a force direct graph may be used to visualize the computational elements and the activity between the elements. In many cases, force directed graphs may be used to identify bottlenecks or other irregularities during execution.

The force directed graph of embodiment 100 may illustrate one time period during the execution of an application. In such embodiments, the execution of an application may be traced over time and the force directed graph may illustrate how the application behaves. The force directed graph of embodiment 100 may be updated periodically with newly collected data, which may visually show operations of the application.

The force directed graph of embodiment 100 may illustrate the operations of an application. In some embodiments, the force directed graph may illustrate the system state of a device or application at discrete periods of time. An example of a graph illustrating the system state may include nodes representing the state of memory objects, functions, input/output devices, memory storage devices, or other hardware or software objects. In some embodiments, the force directed graph may illustrate activities that may occur between two periods of time. An example of such a graph may include functions or processes and messages passed between processes.

The force directed graph may show nodes 102, 104, 106 and 108 connected by various edges. Edge 112 connects nodes 102 and 104. Edge 114 connects nodes 102 and 106, while edge 116 connects nodes 102 and 108 and edge 118 connects nodes 106 and 104. Additional nodes and edges are also illustrated.

A force directed graph may be computed by applying an attractive force connecting two nodes with an edge, and at the same time applying a repulsive force to nodes in general. In many embodiments, a force directed graph may be displayed in an interactive manner such that a user may be able to perturb the graph by clicking and dragging an object or through some other mechanism. As a perturbation is introduced, an interactive graph may show the various nodes and edges change position.

The force directed graph of embodiment 100 may show additional data elements. For example, the relative size, shape, and color of the various nodes may be configured to indicate different characteristics of the node. In another example, the edges may display characteristics using thickness, color, and other visual elements.

When a force directed graph displays the execution of an application, the nodes may represent compute elements. The compute elements may be processes, threads, processors, devices, or other elements that may pass messages to other elements. In such a graph, the edges may represent messages passed between compute elements.

Nodes representing compute elements may be modified to reflect additional data. For example, the color or shape of the node may be modified to show groupings of the compute elements. In the example of embodiment 100, a legend 126 illustrates different colors or patterns applied to the nodes and the meaning of the patterns. Nodes representing compute elements from library A 120 may include nodes 102 and 108. Nodes representing compute elements from library B 122 may include nodes 104 and 106. Node 110 may represent a core process 124.

Groupings may reflect different shared characteristics of the objects. For example, nodes may be grouped by library, code module, or other group, and such a grouping may assist a developer in understanding program flow. In another example, nodes may be grouped by memory consumption, where those nodes representing compute elements that consume large amounts of data are grouped together, or where compute elements that reference specific groups of memory objects are grouped together. In another example, processes or functions that operate on a specific process scheduler may be shown as groups. In still another example, nodes that may be related to a memory domain may be grouped.

In some embodiments, a legend may be shown as part of a graph. The legend may have colors, shapes, or other visual elements and a corresponding label. In some embodiments, the legend may have a selection mechanism whereby a user may be able to select a grouping using a drop down menu or other selection tool. In some such embodiments, a user may be able to select one visual effect to correspond to one grouping while another visual effect may correspond to another grouping. For example, a legend may be used to configure grouping by memory domain to be illustrated by shapes that represent each domain, while nodes relating to specific services may be grouped by color.

The legend 126 may have a selection tool for selecting a grouping to be shown. A toggle button 136 may open a drop down list that may contain several options. In the case of embodiment 100, the options may include grouping by processor 138, memory domain 140, scheduler 142, and service 144. The service 144 selection is currently selected, as indicated by a star. When a user selects a different grouping, the grouping may be applied to the various nodes by changing the color, shape, or other visual element.

The size of the various nodes may reflect different aspects of the computational elements. For example, the size may represent the amount of computation performed by a particular element, the number of times the element was called, the amount of data handled by the element, or other factors. In some cases, a specific color may be applied to an element that receives input data from an external source and a different color may be applied to an element that transmits output data.

Likewise, the edges may be modified to show various aspects of the messages. For example, the messages may be aggregated to show the number of messages along a specific path, the frequency of messages, the data payloads of the messages, as well as directionality of the messages and other features. The edges corresponding to the messages may be modified using different thicknesses, colors, or other visual elements to illustrate one or more of the aggregated parameters.

The operation of an application may produce many messages that may be passed over time. Such time-related data may be displayed using a time series of datasets, where each dataset may reflect the state of the application at a period of time or as an aggregation of the messages passed during a time interval.

In some embodiments, a tracing system may collect message passing information from an active application and store the collected data in a database. An aggregator may analyze the database to summarize message passing activities for individual time intervals. In some cases, such summarizing may be performed by the tracing system without storing message passing data in a separate database.

Aggregated data may be displayed in a force directed graph by updating the data within the force directed graph. In many visualizations of a force directed graph, the dataset may be updated, causing the force directed graph to reposition itself with the updated data.

A force directed graph may reflect the operations of an application in real time. In such an embodiment, a tracer system may collect message passing data from a compute environment and aggregate the data for presentation. The data may be updated at a periodic interval, such as every second, then transmitted to a system displaying the force directed graph. The force directed graph may be updated and change with each update, allowing a user to visualize the operations of the application in real time or near real time.

When datasets may be collected and stored in such an embodiment, a control panel user interface may allow a user to browse and view the various datasets. For example, a reverse button 128 may cause older data sets to be shown in reverse order. A play button 130 and a pause button 132 may start and stop a force directed graph to be updated. A fast forward button 134 may cause the playback to occur at a faster than normal speed.

Figure 2:
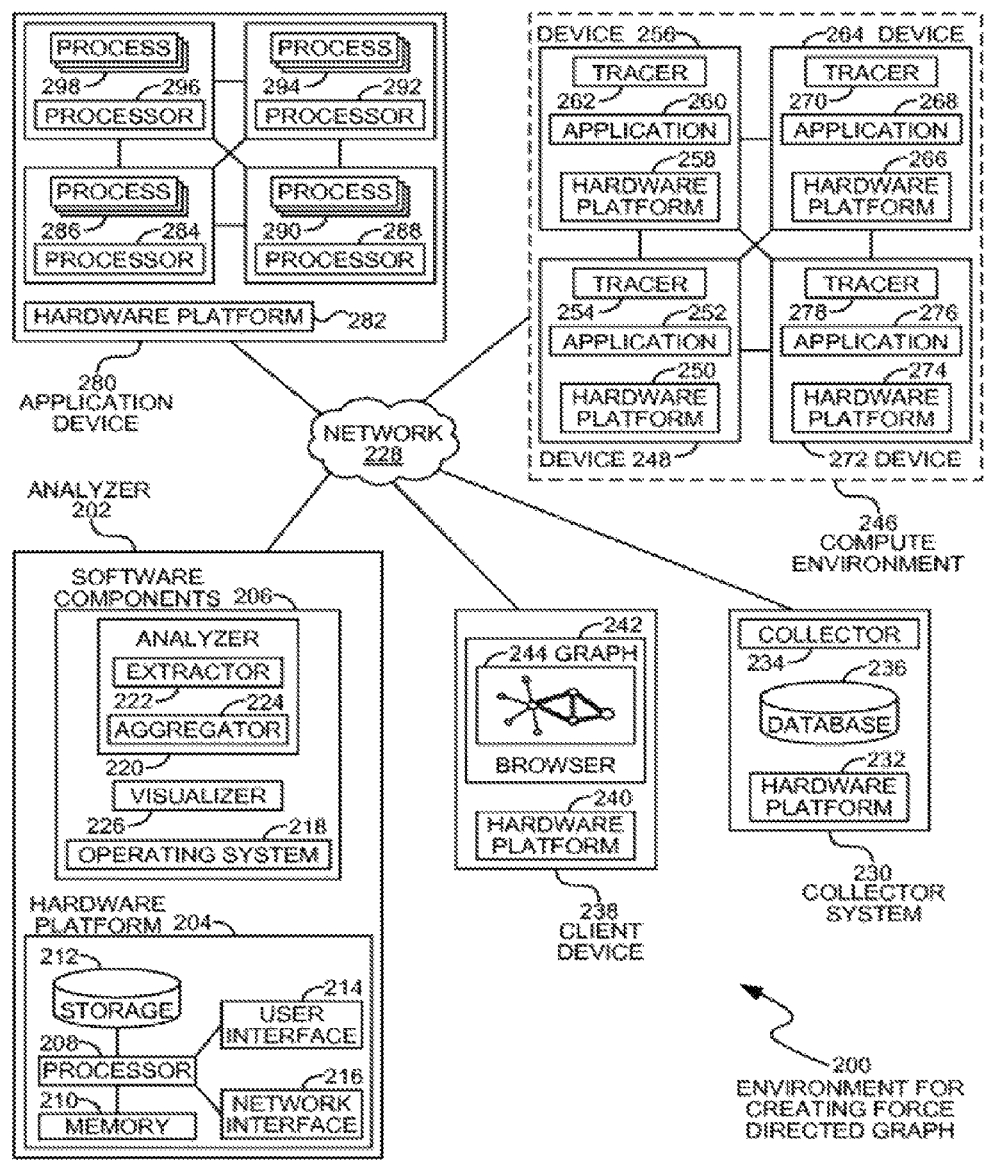
FIG. 2 is a diagram illustration of an embodiment showing an environment for data collection and display using a graph.

FIG. 2 is a diagram of an embodiment 200 showing a computing environment that may collect and display message passing data in a graph. Embodiment 200 illustrates hardware components that may deliver the operations described in embodiment 100, as well as other embodiments.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the optimization server 202 may be a server computer. In some embodiments, the optimization server 202 may still also be a desktop computer, laptop computer, netbook computer, tablet or slate computer, wireless handset, cellular telephone, game console or any other type of computing device. In some cases, the optimization server 202 may be deployed on a computing cluster, cloud computing environment, or other hardware platform.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various applications 244 and services may operate. An operating system may provide an abstraction layer between executing routines and the hardware components 204, and may include various routines and functions that communicate directly with various hardware components.

Each of the various devices illustrated in embodiment 200 may have a hardware platform. The respective hardware platforms may be similar to the hardware platform 204. The devices may be any type of hardware platform, such as a personal computer, server computer, game console, tablet computer, mobile telephone, or any other device with a programmable processor.

The analyzer device 202 may contain an operating system 218, which may support various other software components. The components may include an analyzer 220, which may prepare data for visualization. The analyzer 220 may take data collected while an application runs using an extractor 222 and aggregate the data using an aggregator 224 to create data that may be visualized by a visualizer 226.

A collector system 230 may operate on a hardware platform 232 and have a collector 234 that may gather trace data collected while an application executes and store the data in a database 236. These data may then be processed by the analyzer 220.

A client device 238 may have a hardware platform 240 in which a browser 242 may execute. The browser 242 may display a graph 244 that may be generated by the visualizer 226.

The architecture of embodiment 200 illustrates a system where an analyzer 202 may prepare data for a visualizer 226 to display a graph 244 that may be rendered in a browser 242. In such an architecture, message passing data may be collected on an ongoing basis, then a separate processing step may be performed by the analyzer 220. Such an architecture may allow multiple analyses of the raw data to be performed.

For example, when the raw data are stored prior to analysis, time series of datasets may be configured with different periods. For example, a time series for a long time period may be created that illustrates changes that may occur over a long period of time. At the same time, a detailed time series may be created for very small time periods. A longer time period may help a user understand long term activities that occur in an application, while the detailed time series may show a much higher level of detail for debugging, for example.

Another embodiment may include some of the operations of the collector 234 and analyzer 220 into a single component. In such embodiments, the data may be analyzed, aggregated, and prepared for viewing in a single software component. Such a component may be integrated into a tracer that runs on the same device as the application under test in some cases. Still other architectures may perform similar operations but are configured differently.

An example of a compute environment 246 illustrates multiple devices which may interact in a high performance computing environment or other environment where message passing may be deployed. Each device 248, 256, 264, and 272 may have a respective hardware platform 250, 258, 266, and 274. An application 252, 260, 268, and 272 may execute with a respective tracer 254, 262, 270, and 278 on the respective hardware platforms.

The example of compute environment 246 may be deployed in a cluster environment, dispersed computing environment, or some other manner such that the various devices may communicate with each other. The applications may contain the same or different executable code that may be configured to pass messages to other devices in order to execute a workload that may be larger than can be performed on a single device.

Another example of a compute environment may be an application device 280 that may have a hardware platform 282 which may contain one or more processors. On each processor, multiple processes may execute and pass messages between the processes. In the example of device 280, four processors 284, 288, 292, and 296 are illustrated as executing processes 286, 290, 294, and 298.

One example of such a system may deploy a functional language, such as Erlang, whereby a single application may be executed using many individual processes, threads, or other compute elements. The various elements may communicate with each other by passing messages within the device 280. In some applications, many thousands, tens of thousands, or even millions of processes and messages may make up an application during execution.

Figure 3:
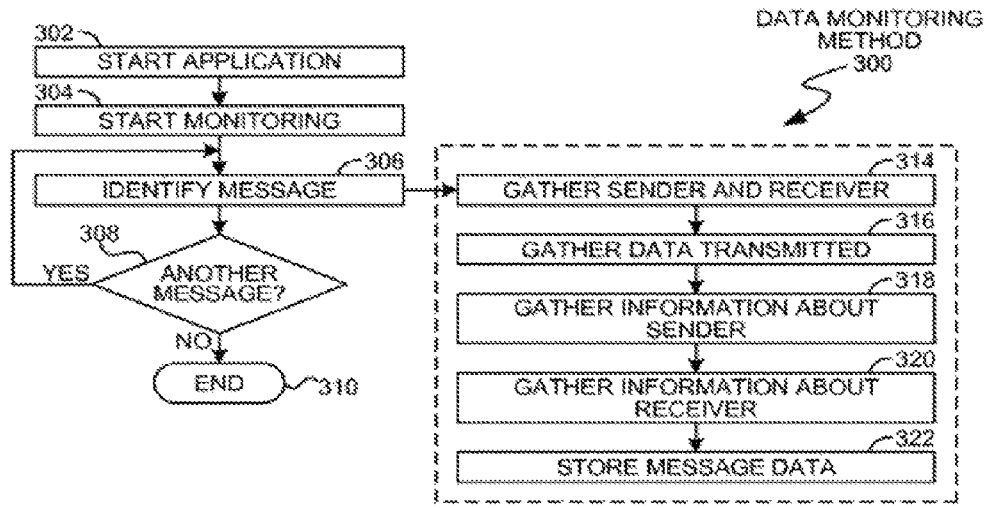
FIG. 3 is a flowchart illustration of an embodiment showing a method for gathering data.

FIG. 3 is a flowchart illustration of an embodiment 300 showing a method for monitoring data. Embodiment 300 illustrates the operations of a tracer that may gather message passing data and store the data in a database for later analysis. The operations of embodiment 300 may reflect the operations of tracer 254, for example, in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may illustrate a method whereby each message passed may be analyzed to gather various data. The architecture of embodiment 300 illustrates one routine that may monitor an application and when a message is identified, a data gatherer instance may be deployed. The data gatherer instance may collect various data and store the data.

An application may be started in block 302 and monitoring may start in block 304. When a message is identified in block 306, a data gatherer instance 312 may be deployed. The monitoring may continue in block 308 until another message is identified, causing the process to return to block 306 and launch another data gatherer instance 312. When no more messages are identified in block 308, the process may end in block 310.

The data gatherer instance 312 may reflect the operations of a process or function that may operate on a single message. From the message, the sender and receiver may be identified in block 314. The data transmitted in the message payload may be gathered in block 316.

Information about the sender may be gathered in block 318 and information about the receiver may be gathered in block 320. Such information may include how much processing may be performed, the nature of the processing, or other information. Once all of the information has been gathered, the message data may be stored in block 322.

Figure 4:
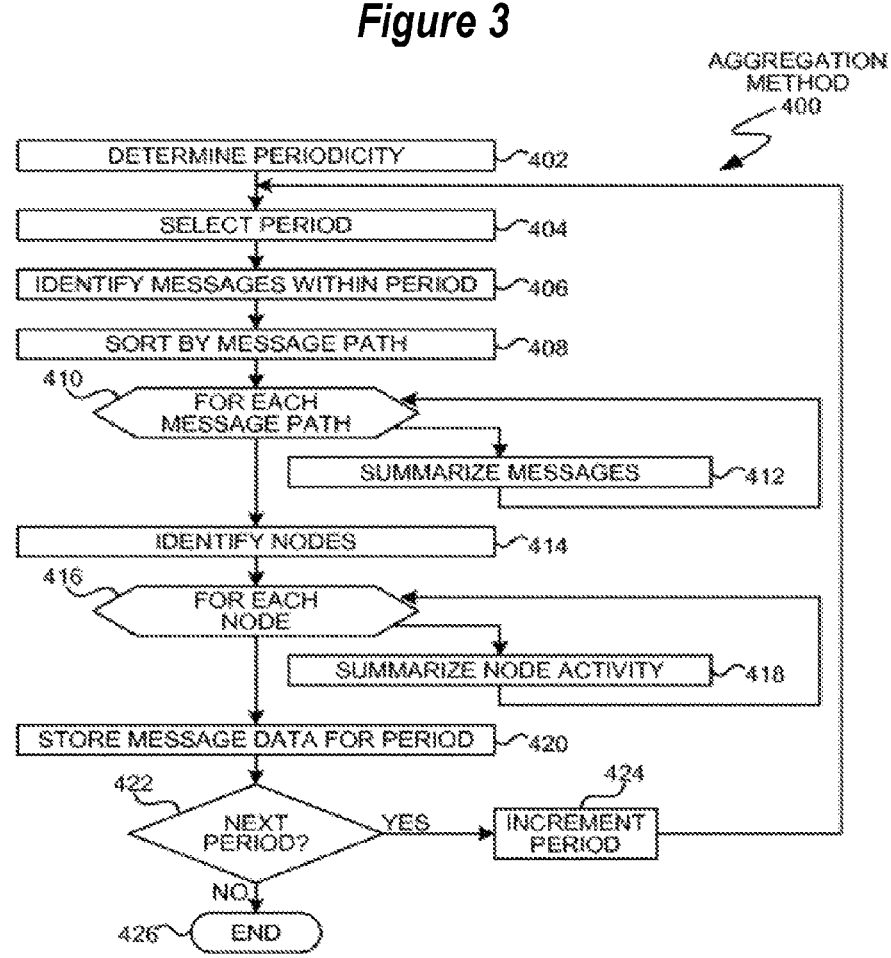
FIG. 4 is a flowchart illustration of an embodiment showing a method for aggregating data prior to visualization.

FIG. 4 is a flowchart illustration of an embodiment 400 showing a method for analyzing and aggregating data. Embodiment 400 illustrates the operations of an analyzer that may analyzed and aggregate data collected in embodiment 300. The operations of embodiment 400 may reflect the operations of analyzer 220, for example, in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates an example of how message passing data may be analyzed prior to visualization. In some embodiments, the operations of embodiment 400 may be performed inline with the operations of a data monitoring method. Some such embodiments may apply the aggregation method 400 within a tracer to create data that may be ready for display as quickly as possible, so as to enable real time or near-real time visualizations of an application.

The periodicity of a dataset may be determined in block 402. The periodicity may define the time interval of a time series. For monitoring an application, the periodicity of a time series may be values less than a millisecond, in the sub-second range, in the single digit seconds, or longer. Depending on the application, some instances may have periods of tens of seconds, single digit minutes, tens of minutes, hours, days, weeks, or longer.

A starting period may be selected in block 404. Messages passed within the period may be identified in block 406. In some cases, the selected messages may have multiple messages that communicate between compute elements, which may be sorted by the message path in block 408.

For each message path in block 410, a summary of the messages passed may be made in block 412. The summary may include the number of messages, direction of those messages, amount of data passed, frequency, or other statistics. In some cases, the summaries may be nonlinear summaries. For example, a logarithm, square, cubic, or other function may be used to generate aggregated summaries. In many data collection scenarios, some objects may be accessed one, two, or a handful of times while other objects may be accessed thousands or even millions of time. In order to present such data comparisons within a graph, a nonlinear scaling of the data may be used.

Each node may be identified in block 414. For each node in block 416, the node activity may be summarized in block 418. The summary may include the amount of computation performed by the compute element, input or output data passed to or from the element, type of computing performed, as well as statistics relating to the computation such as the time busy, waiting, performing garbage collection, heap size, memory calls, or other information.

After analyzing all of the message data for the period of time, the message data may be stored in block 420 as a data set. If another period is to be analyzed in block 422, the period may be incremented in block 424 and the process may return to block 404. When no more periods are to be analyzed in block 422, the process may end in block 426.

Figure 5:
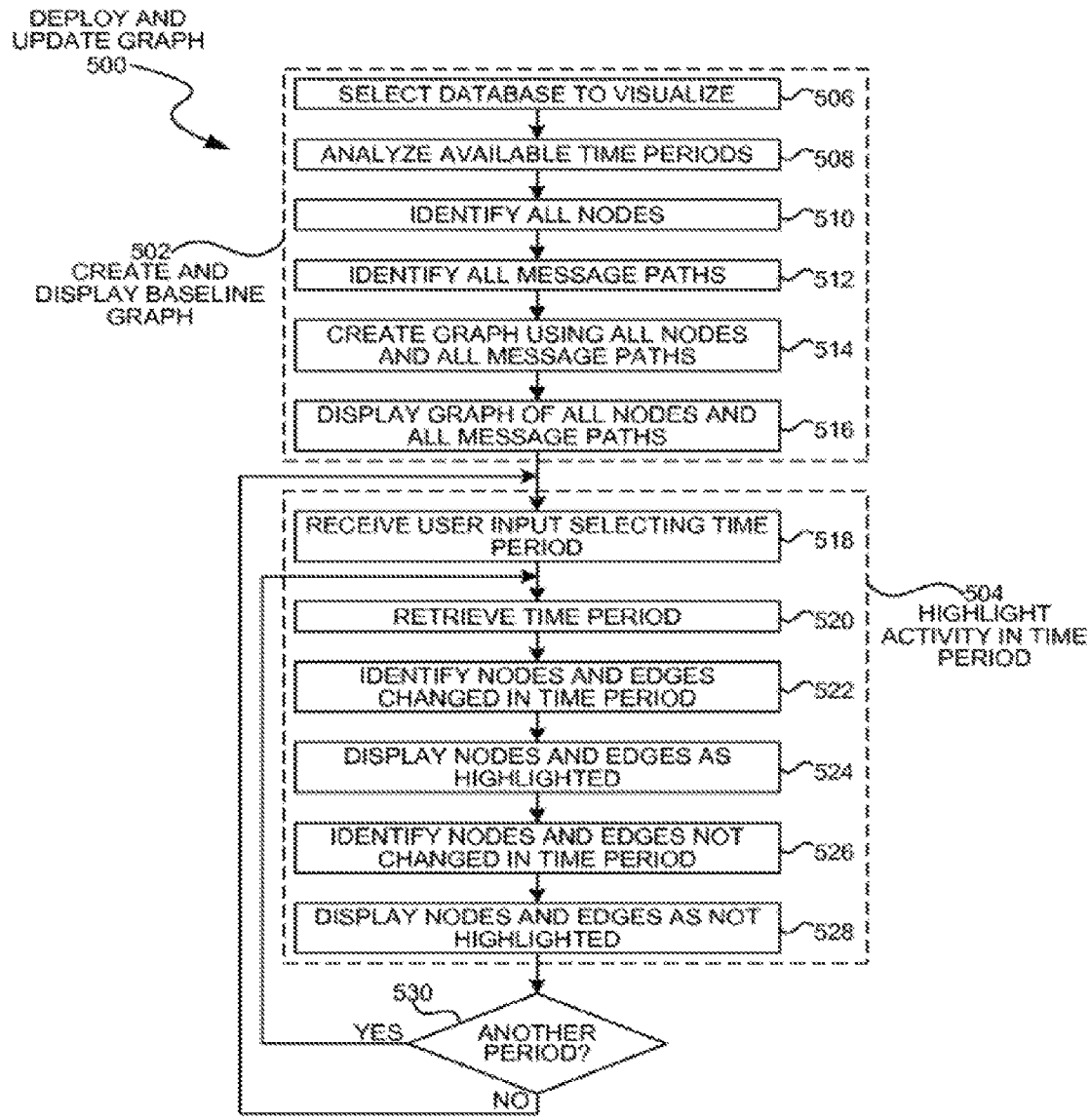
FIG. 5 is a flowchart illustration of an embodiment showing a method for deploying and updating a graph.

FIG. 5 is a flowchart illustration of an embodiment 500 showing a method for deploying and updating a graph. Embodiment 500 illustrates the operations of a visualizer of the data aggregated in embodiment 400. The operations of embodiment 500 may reflect the operations of visualizer 226, for example, in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates two separate activities that may be performed to display a graph. A baseline graph may be created and displayed in block 502 and highlights may be added in block 504 on an ongoing basis.

The baseline graph of block 502 may display a graph that contains all nodes and edges from a large database. In many instances, such a graph may represent the long term operations of an application and may be useful to understand the application.

A database may be selected in block 506 to visualize. All of the time periods may be analyzed in block 508 to identify all nodes in block 510 and all message paths in block 512. In some embodiments, summary statistics may be generated over all of the nodes and edges in blocks 510 and 512, respectively. The corresponding graph may be generated in block 514.

The baseline graph generated in block 514 may be a static graph that illustrates summary statistics from many time periods. In many embodiments, the baseline graph may serve as a framework for other illustrations.

For example, the operations of highlighting activity in block 504 may identify changes to the graph from a specific time period and overlay those changes on the baseline graph. In one such example, a baseline graph may contain representations of all the computational elements and messages that may be passed during the lifetime of an application. In order to see the recent operations, operations in a current time period may be identified and displayed with visual highlighting, where other compute elements and message paths that were not exercised in the time period may be displayed without highlighting. In such an example, all of the nodes and edges may be displayed in a greyed-out fashion with currently executing nodes and messages shown in a vibrant color.

In such a display, the baseline graph may provide a visual context on which the current changes may be displayed.

The operations for highlighting activities in block 504 may include receiving user input that selects a time period in block 518. A dataset for the selected time period may be retrieved in block 520.

Nodes and edges within the selected time period may be identified in block 522 and displayed as highlighted in block 524. Those nodes and edges not changed in the time period may be identified in block 526 and displayed as not highlighted in block 528.

In many cases, the user may select a current time period to display. Such a selection may update a graph in real time or near-real time. When an embodiment incorporates various navigation tools, such as the control buttons of embodiment 100, a user may be able to browse, scroll, or use some other mechanism to identify a data set to display.

When a visualization is updated over period of time while an application executes, some embodiments may display only those elements that have been changed in the last sampling period of the time series. In such embodiments, the shape of a force directed graph or other visualization may change rapidly, especially when the time period may be very short.

Some such embodiments may decay and remove elements over multiple updates. In such an embodiment, each node or edge may be displayed for a predefined number of periods, then removed from the graph. As the node becomes older and is not used, the node may be displayed in a greyed-out fashion in some such embodiments.

Figure 6:
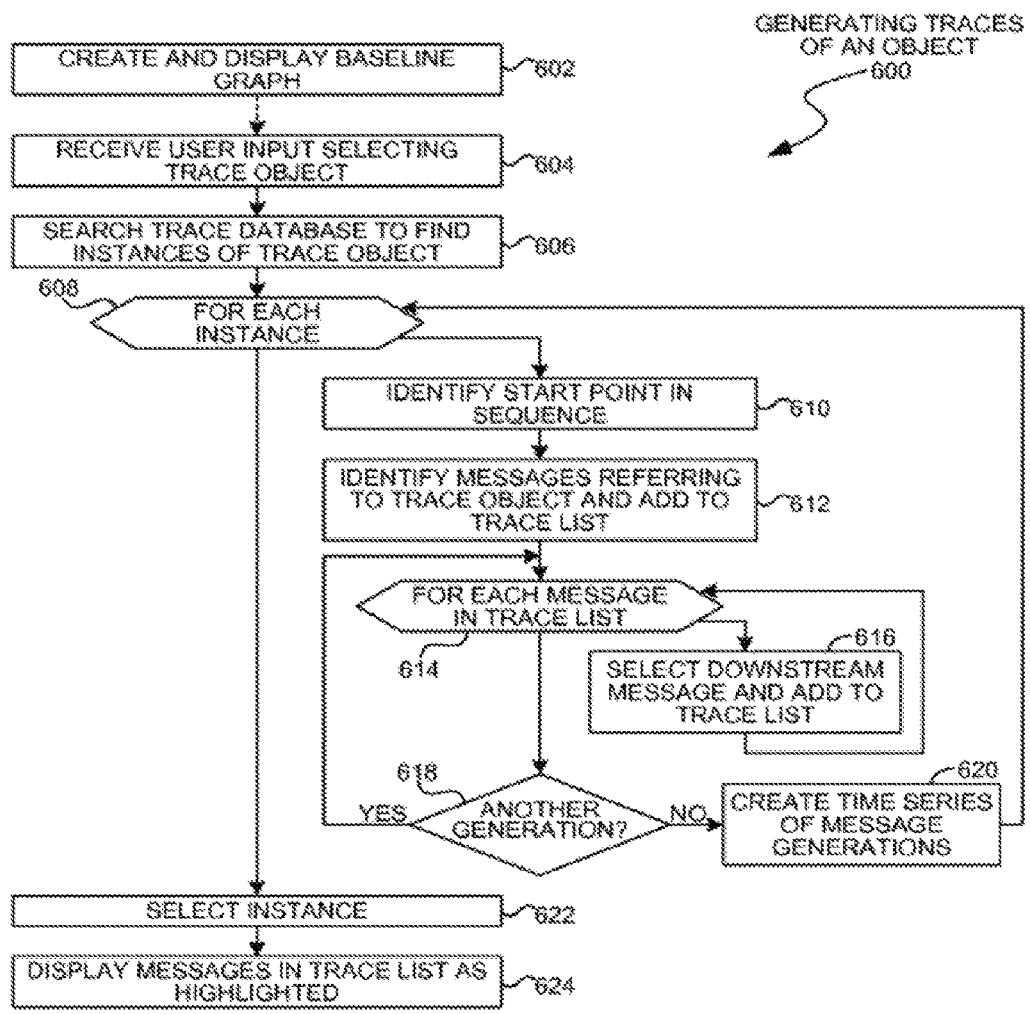
FIG. 6 is a flowchart illustration of an embodiment showing a method for generating traces of objects on a graph.

FIG. 6 is a flowchart illustration of an embodiment 600 showing a method for generating traces of an object within a graph. Embodiment 600 illustrates another version of changes that may be made to a baseline graph, similar to the operations of embodiment 500. In some cases, the operations of embodiment 600 may be modified to update a graph without using the baseline graph.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of embodiment 600 may illustrate one method by which an object and its effects may be illustrated within a graph, such as a force directed graph. After defining an object, one, two, or more generations of messages stemming from the object may be highlighted to create an update to a baseline graph. The update may be displayed on a baseline graph as highlighted nodes and edges to illustrate the effects of the selected object.

A baseline graph may be created and displayed in block 602. An example of the operations of block 602 may be found in block 502 of embodiment 500.

A selection for a trace object may be received in block 604. A trace object may be any event, memory object, condition, function, or other parameter that a user may wish to examine. A user may be able to define a memory object to trace, for example, when the memory object is changed or is set to a specific value. Once such a condition is met, the effects of the condition may be illustrated.

After defining a trace object, instances of the trace object may be searched in the message passing database. In some cases, multiple instances of the condition may be identified. When multiple instances exist, a time series of datasets may be generated for each instance and a user may be able to select between the instances to view the time series datasets.

For each instance in block 608, a starting point for the sequence may be identified. The starting point may be a starting time or period that the condition originates.

Any messages referring to the trace object may be identified in block 612 and added to a trace list. A message may refer to a trace object when the selected object interacts with a compute element and the compute element passes a message to another compute element. For example, a trace object may be an input event that may be processed by a first compute element, which may send a message to two other compute elements. Such messages may be added to a trace list in block 612.

The operations of block 612 may identify an original set of messages that may be triggered by a trace object or condition. For each message in the trace list in block 614, downstream messages may be identified in block 616 and added to the trace list. The downstream messages may be messages that may have been triggered by the original messages identified in block 612. If additional generations of messages are desired in block 618, the process may return to block 614 to add additional messages.

When all of the desired generations of messages may be identified in block 618, a time series of all the generations of messages may be created in block 620. The time series may include separate data sets that represent individual generations of messages that may be passed from compute element to compute element in response to the trace condition.

An instance may be selected in block 622 and the messages may be displayed as highlighted messages in block 624. In many cases, the highlighted messages may be displayed on the framework of a baseline graph that may be created and displayed in block 602.

Figure 7:
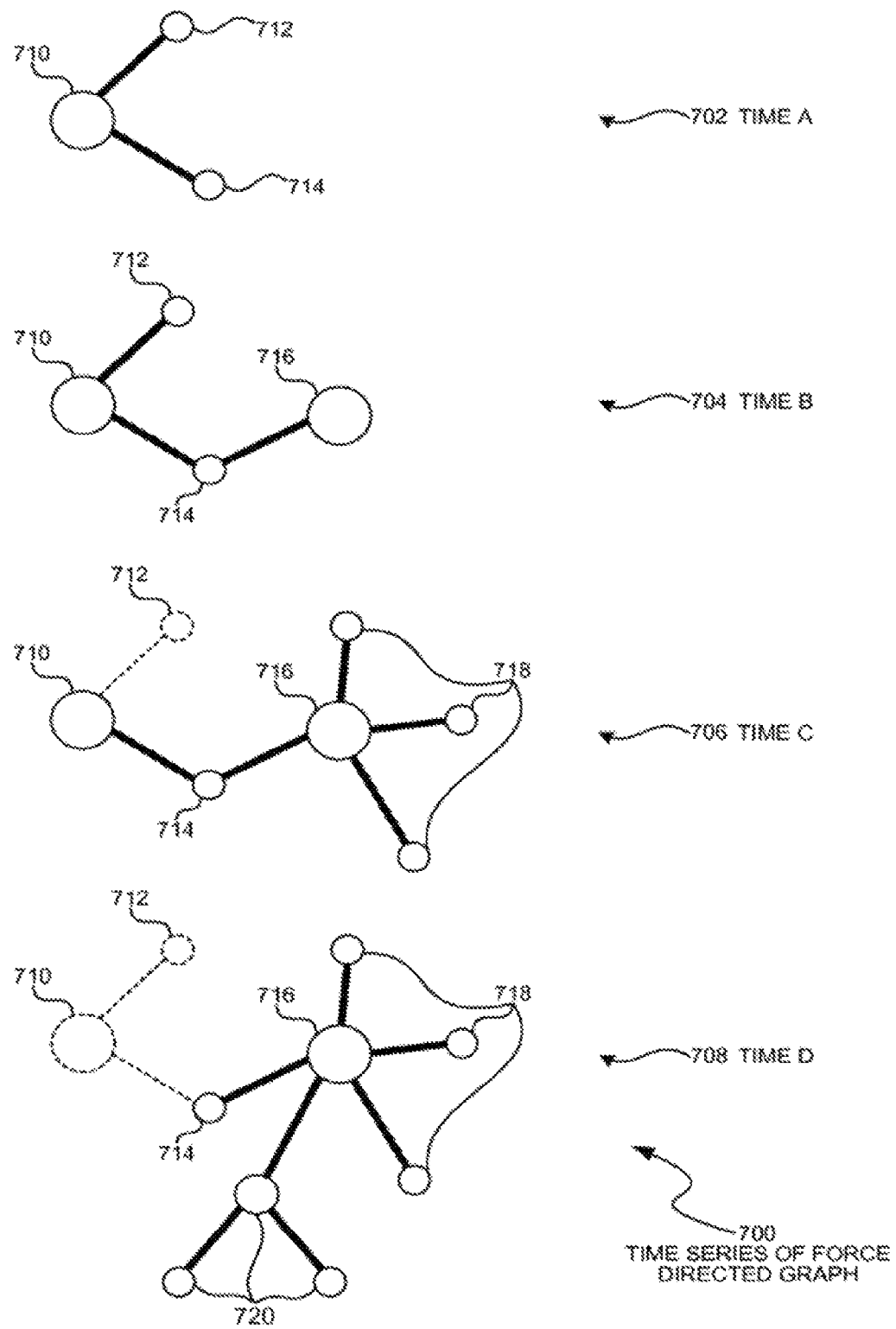
FIG. 7 is a diagram illustration of an embodiment showing a sample force directed graph displaying a time series.

FIG. 7 is a diagram illustration of an embodiment 700 showing a time series of data sets displayed as a force directed graph. Embodiment 700 shows a time A 702, time B 704, time C 706, and time D 708. Embodiment 700 is a simplified example of a force directed graph that may grow and decay over time.

Embodiment 700 illustrates a simple force directed graph that may be created and may grow and decay with each successive time step.

At the initial time step, time A 702, nodes 710, 712, and 714 are illustrated. At the second time step, time B 704, node 716 may be added.

In the third time step, time C 706, nodes 718 are added while node 712 may be either removed or displayed in a greyed out mode. In the fourth time step, time D 708, nodes 720 are added and nodes 710 and 712 may be removed or displayed in a greyed out mode.

Embodiment 700 shows the progression of a trace of an application over time. In each time period, the compute elements may be represented by the nodes and messages passed between the compute elements may be represented by the edges of the graph. Initially, three compute elements are present and two message paths were exercised in time A 702. As time progresses, additional compute elements are used and additional message paths are exercised.

At time C 706, one of the nodes and message paths may no longer be used. In such a case, some embodiments may preserve the representation of node 712 as a greyed-out version. Other embodiments may remove the node 712 when the node 712 has not been exercised.

Some embodiments may decay the representations over time. In such embodiments, each node may be illustrated for several time periods, even when the node is not exercised in the successive time periods. The node may be illustrated with full color intensity when it is initially displayed, then the node may be illustrated with less intensity at each successive time period until the point where the node may be removed from the graph. Such an embodiment may keep a node visible for several time periods so that a user may visualize the node, but may remove the node when the node has not been exercised.

In an example, a node may be displayed with full intensity for two, three, or more time periods in an animated representation. After the initial display, the node may be illustrated with decreasing intensity for another 15 time periods, after which the node may be removed from the graph. In some embodiments, the time period for decay and for the initial representation may be adjustable by a user.

Figure 8A:
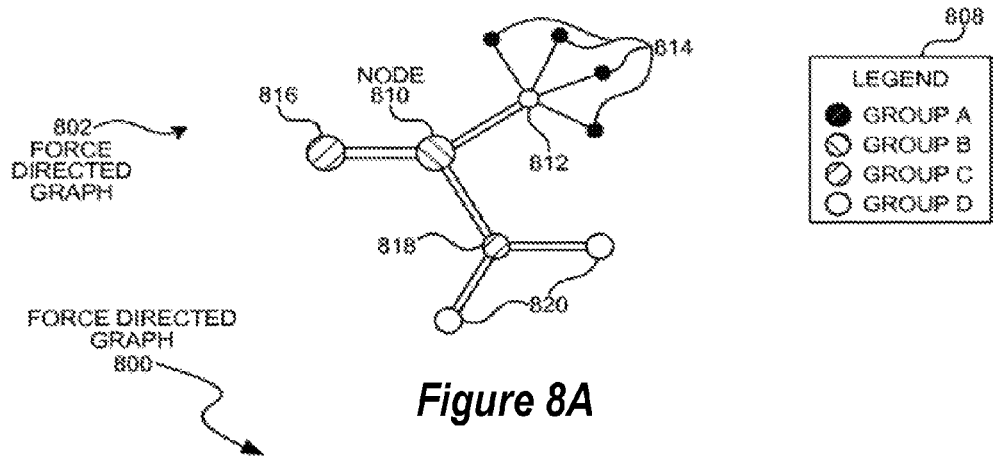
FIGS. 8A, 8B, and 8C are a sequence of diagram illustrations of an embodiment showing a selection mechanism with a force directed graph.
Figure 8B:
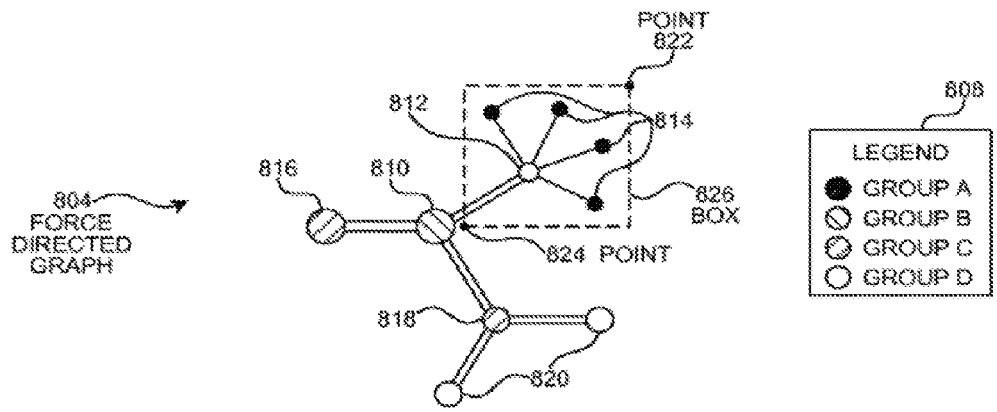
Figure 8C:
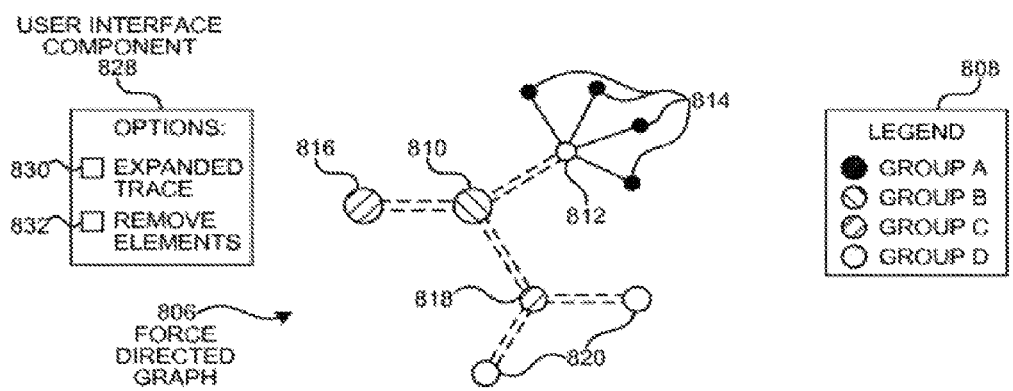

FIGS. 8A, 8B, and 8C are diagram illustrations of example embodiments 802, 804, and 806 showing force directed graphs in a user interface. Embodiments 802, 804, and 806 illustrate a sequence of interactions that may be performed with user input to select a group of graphical elements, then perform an action on the selected elements. Each of the embodiments 802, 804, and 806 comprises a force directed graph and a legend 808.

Embodiments 802, 804, and 806 may illustrate one mechanism to select multiple elements from a force directed graph: such a mechanism may be an area selection using a rectangular window. Other embodiments may permit a user to select groups of elements by other selection mechanisms, such as a lasso tool, clicking on a succession of elements, or other mechanisms.

The nodes of embodiments 802, 804, and 806 are commonly labeled. The force directed graphs are composed of nodes 810, 812, 814, 816, 818, and 820.

Embodiment 802 may represent a force directed graph as displayed in a user interface. Embodiment 804 may illustrate the force directed graph of embodiment 802 with a window selection. The window selection may be defined by points 822 and 824 to define a selection box 826.

The selection box 826 may be created by a user by defining the points 822 and 824. One mechanism for creating the points 822 and 824 may be to click and drag a stylus, cursor, or other pointing tool within the displayed area of the force directed graph.

The selection box 826 may capture node 812 and the group of nodes 814, which may illustrate one use scenario. Specifically, a force directed graph or other visualization may illustrate relationships and groups of elements in ways that may not be readily apparent without the visualization. The selection mechanism performed with the visualization may allow a user to select related objects quickly and easily, especially when the relationships may not be apparent by other mechanisms.

For example, node 812 may represent one function in a library and nodes 814 may represent a group of functions in a second library. When initially started, a programmer may or may not be able to determine that the two sets of functions were related. After running a tracer and visualizing the relationships in a force directed graph 802, the programmer may be able to identify the relationships.

After selecting node 812 and group of nodes 814, the user may perform additional operations, as illustrated in embodiment 806.

In embodiment 806, the selected items 812 and 814 may be illustrated as highlighted while the remaining portions of the force directed graph may be illustrated as not highlighted. Some embodiments may display non highlighted elements using transparency, color schemes such as greyed-out colors, or other visual cues. Some embodiments may display highlighted elements using brighter or more vibrant colors, different color pallets, boldness, or other visual cues.

Once selected, the items may be have some activity or changes to be applied to the selected group. Such a change may be selected from a user interface component 828, which may have various options 830 and 832.

In some embodiments, the selected activity may cause the tracer to change the way data are collected. In such embodiments, the force directed graph may be a user interface component for controlling or managing a tracer. An example of such a change may to increase the detail of tracing for the selected elements. Such a change may increase the tracing data for subsequent time slices. In another example, the tracer may be instructed to remove the selected elements from future data sets. In such a change, the tracer may reduce the amount of data collected in future time slices.

In some embodiments, the selected activity may cause a preprocessor to change the way trace data are processed or presented on the user interface. An example may be to show cumulative data for the selected elements or to visually highlight objects that may flow from the selected elements. Such selections may not cause the tracer to change the data collected but may cause a preprocessor or visualizer to change the way the data are illustrated.

Figure 9A:
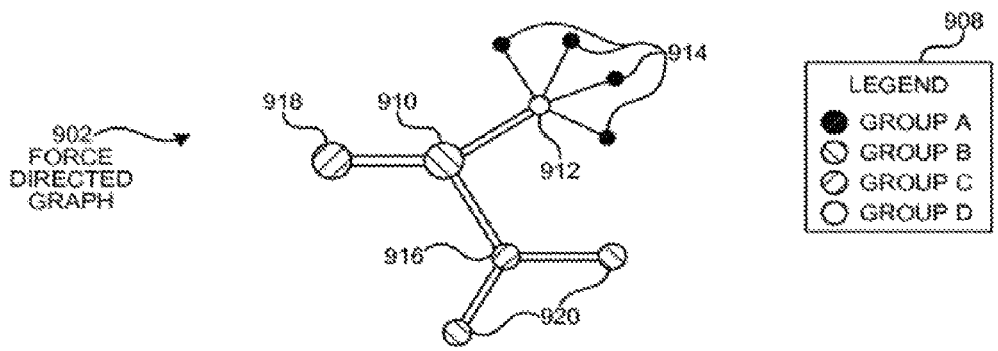
FIGS. 9A, 9B, and 9C are a sequence of diagram illustrations of an embodiment showing a second selection mechanism with a force directed graph.
Figure 9B:
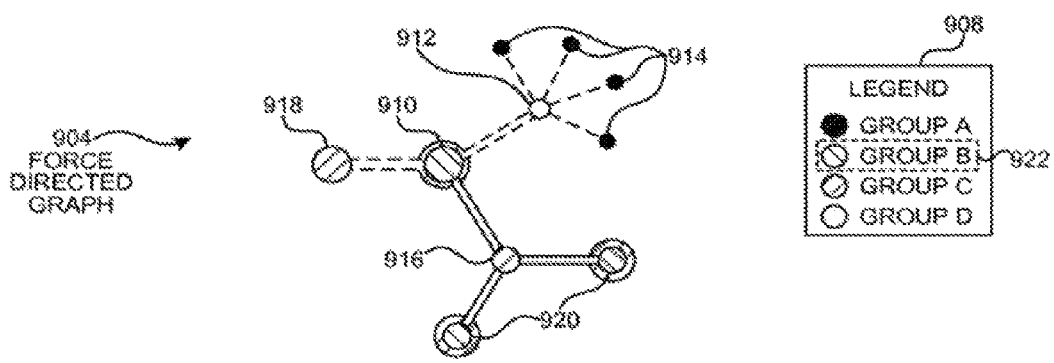
Figure 9C:
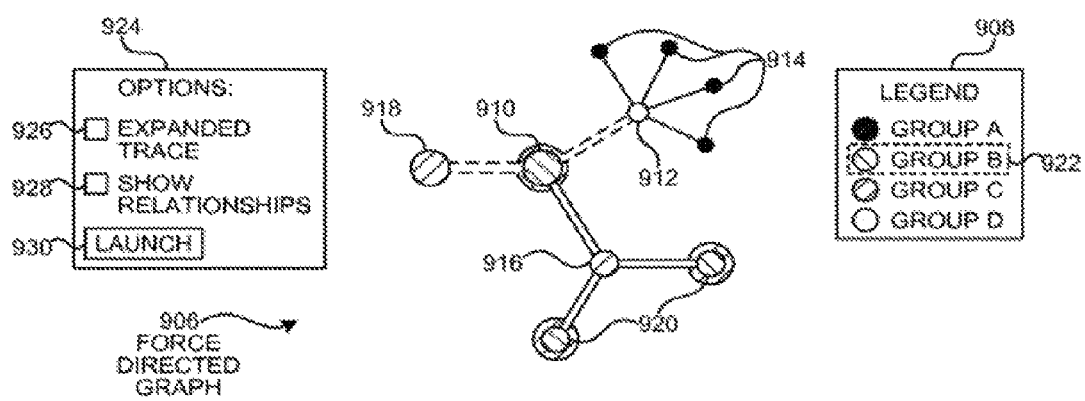

FIGS. 9A, 9B, and 9C are diagram illustrations of example embodiments 902, 904, and 906 showing force directed graphs in a user interface. Embodiments 902, 904, and 906 illustrate a sequence of interactions that may be performed with user input to select a group of graphical elements, then perform an action on the selected elements. Each of the embodiments 902, 904, and 906 comprises a force directed graph and a legend 908.

Embodiments 902, 904, and 906 may illustrate one mechanism to select multiple elements from a force directed graph: such a mechanism may use a legend label to select members of a group of elements.

The nodes of embodiments 902, 904, and 906 are commonly labeled. The force directed graphs are composed of nodes 910, 912, 914, 916, 918, and 920.

Embodiment 902 may represent a force directed graph as displayed in a user interface. Embodiment 904 may illustrate the force directed graph of embodiment 902 with a selection made from the legend 908. The selection 922 within the legend 908 may cause all of the objects with membership in group B to be selected and highlighted.

Embodiment 904 illustrates nodes 910 and 920 as the selected members of group B, while the remaining elements may be illustrated as not highlighted. The relationships of nodes 910 and 920 are also illustrated as highlighted, while the remaining relationships or edges may be illustrated as not highlighted.

Once the elements associated with the selection 922 are selected, a user interface component 924 may be presented. A user may be able to select between options 926 and 928 to apply changes to a tracer or changes to how the data are preprocessed and displayed, in a similar manner as with the user interface component 828. When the selections may be made, a launch button 930 may be used to cause the changes to be implemented.

Figure 10:
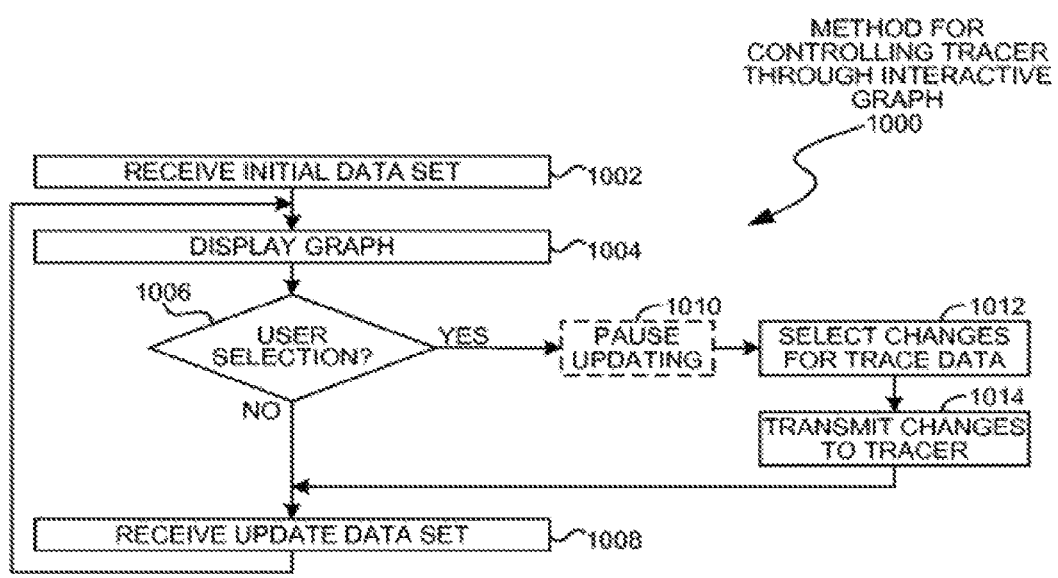
FIG. 10 is a flowchart illustration of an embodiment showing a method controlling a tracer through an interactive graph.

FIG. 10 is a flowchart illustration of an embodiment 1000 showing a method for controlling a tracer through user interactions with a graph. Embodiment 1000 illustrates a simplified method that may be performed with the user interface examples of embodiments 802, 804, and 806 as well as embodiment 902, 904, and 906.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

An initial data set may be received in block 1002, and a graph may be displayed in block 1004. If there is no user selection in block 106, a new data set may be received in block 1008 and the process may return to block 1004 to show an updated graph.

The loop of blocks 1004 through 1008 may illustrate a normal operation of a user interface display for time series data. The graph may be continually updates with the sequence of data sets within the time series.

In block 1006, a user may select one or more elements of the graph. In some embodiments, updating may be paused in block 1010. The updating may be paused in cases where the graph may change rapidly and the user may not be able to select a set of desired elements while the graph changes.

Once the elements may be selected, changes to be performed on those items may be selected in block 1012. The changes may be transmitted to the tracer in block 1014 and the process may return to block 1008, where a new data set may be received.

Figure 11:
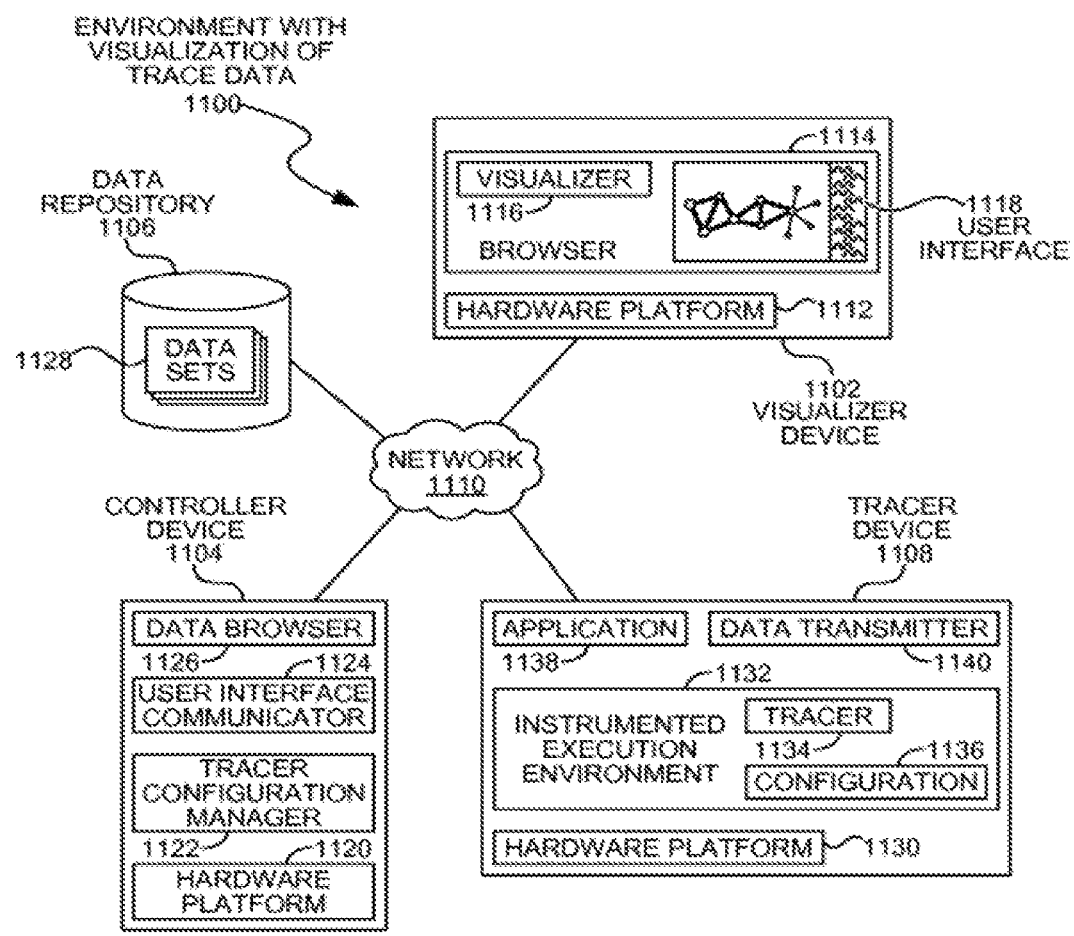
FIG. 11 is a diagram illustration of an embodiment showing a network environment for visualizing trace data.

FIG. 11 is a diagram of an embodiment 1100 showing a computing environment that may collect and display message passing data in a graph, then use the graph to control how those data are collected. Embodiment 1100 illustrates hardware components that may deliver the operations described in embodiment 1000, as well as other embodiments.

The diagram of FIG. 11 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 1100 illustrates a network environment in which visualizations of trace data may be used to control the tracer operation. A visualization device 1102 may display a graph and provide a user interface, while a controller device 1104 may control the data sets to be displayed, as well as manage the operations of a tracer. The controller device 1104 may retrieve data from a data repository 1106. A tracer device 1108 may collect trace data while running an application 1138. All of the various devices may be connected with a network 1110.

The visualizer device 1102 may include on a hardware platform 1112, on which a browser 1114 may execute. A visualizer 1116 may be code running in the browser 1114 that may generate a graph within the user interface 1118.

The controller device 1104 may operate as a backend server that performs several services that support the operations of the visualizer device 1102.

The example of embodiment 1100 illustrates an architecture where the visualizer 1116 may reside on a client device, while other services may reside on a server device. The visualizer 1116 may be located on the client device to improve the user experience with an animated graph. When the visualizer 1116 is located on a user's device, the smoothness of animation and responsiveness of the graph may be improved over architectures where rendering and visualization may be performed on remote devices.

Embodiments where remote devices perform some or all of the visualization may be useful in situations where a client device may not have sufficient processing power to render a graph. Such embodiments may enable more complex and detailed renderings than may be generated with client-side visualization tools.

The controller device 1104 may provide two different functions, one of which may be as a data browser 1126 through which data for a visualization may be retrieved and prepared, as well as a tracer configuration manager 1122, where changes to a tracer may be created and dispatched. A user interface communicator 1124 may be accessed through components in the browser 1114 to cause changes in the data browser 1126 or the tracer configuration manager 1122.

In some embodiments, a user interface 1118 may include a dialog box, selection tool, or other user interface component that may be used to configure or change configuration of a tracer. Such configuration may include items relating to the general operation of the tracer, such as sampling frequency, resources allocated to the tracer, conditions for starting or stopping the tracer, and other general operational options. In some embodiments, such changes may be applied generally or to items selected from the graph.

The data browser 1126 may retrieve data sets 1128 from the data repository 1106 and prepare the data sets for viewing by the visualizer 1116. The data browser 1126 may be responsive to playback controls, such as the controls 128 through 134 in embodiment 100.

The data browser 1126 in normal playback mode may retrieve data sets 1128 and make the data sets available to the visualizer 1116. In many embodiments, such an action may be performed on a recurring, periodic basis according to the time series represented by the data sets 1128. For example, a time series may be created where data sets 1128 may represent each second of time during a time series. In such an example, the data browser 1126 may make each successive data set available each second.

The user interface communicator 1124 may receive commands from the browser 1114 to pause, rewind, fast forward, play, stop, and other commands. These commands may be passed to the data browser 1126 which may begin retrieving data sets 1128 and presenting the data sets in the requested sequence and in the requested frame rate or speed.

The tracer configuration manager 1122 may receive inputs from the user interface communicator 1124, where the inputs may define changes to be made to trace data. The changes may reflect additional data points that may be collected, as well as data points that may be removed or other changes. In some cases, the changes may reflect the behavior or operational changes, such as when the tracer may be executed, the frequency of data collection, or other changes.

The tracer device 1108 may operate on a hardware platform 1130 and have an instrumented execution environment 1132 that may include a tracer 1134 and a configuration 1136 for the tracer 1134. The tracer configuration manager 1122 may update the configuration 1136 to cause the tracer 1134 to change behavior.

An application 1138 may execute in the instrumented execution environment 1132, allowing the tracer 1134 to generate trace data. The trace data may be transmitted to the data repository 1106 by a data transmitter 1140. The data transmitter 1140 may periodically communicate with the data repository 1106 to transmit any collected data from the tracer 1134.

Figure 12:
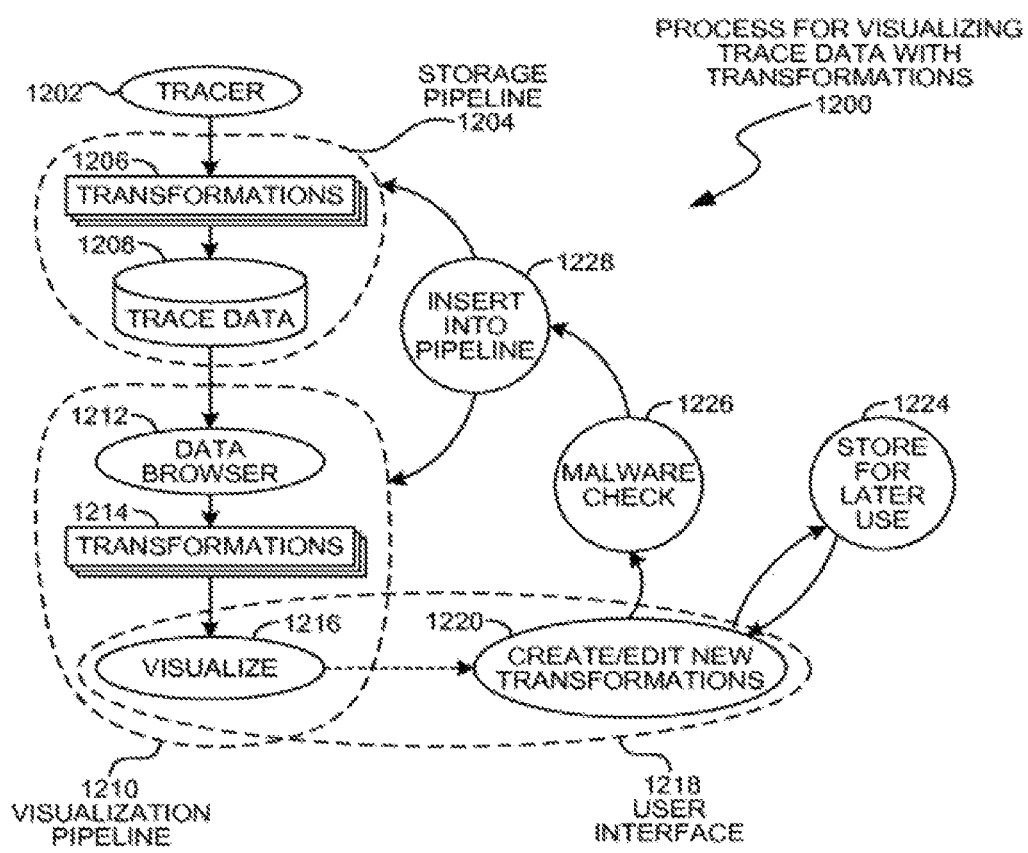
FIG. 12 is a diagram illustration of an embodiment showing a method for visualizing trace data with transformations.

FIG. 12 is a diagram illustration of an embodiment 1200 showing a process for visualizing data from a tracer. Embodiment 1200 may illustrate a processing pipeline where transformations may be inserted. In some embodiments, user written executable code may be inserted into the processing pipeline to prepare data for visualization in many different manners.

A tracer 1202 may generate a stream of trace data that may be processed by a storage pipeline 1204. The storage pipeline 1204 may prepare and process the trace data using a set of transformations in block 1206 for storage in block 1208. In some embodiments, the trace data may be a continuous stream of data items that may be gathered by the tracer 1202. Such streams of data may increase and decrease in volume over time. In other embodiments, the trace data may be snap shots of data reported at specific intervals. Such streams of data may be regularly recurring.

The storage pipeline 1204 may be a set of processes that apply a set of transformations in block 1206 to the data stream, then cause the data to be stored in block 1208. The transformations in block 1206 may apply formatting, data analysis, aggregation, or other changes to the data prior to storage. In many cases, the transformations in block 1206 may perform de-duplication, compression, differencing, or other operations that may reduce the size of the trace data in block 1208, as well as format the data for later retrieval.

The transformations in block 1206 may be applied prior to storage of the trace data in block 1208. When such transformations may be lossy or otherwise diminish the accuracy, fidelity, or completeness of the data, such a transformation may be permanent in the sense that later analysis may not be able to recreate the original data.

After storage in block 1208, a visualization pipeline 1210 may apply an additional set of transformations in block 1214 prior to visualizing the data in block 1216. The visualization pipeline 1210 may prepare the data for visualization. The transformations in block 1214 may not be permanent in the sense that the raw data in block 1208 may still remain, allowing for a different set of transformations to be applied in a later analysis.

The transformations in block 1214 may perform various operations for preparing data for visualizations. In some cases, the transformations in block 1214 may perform formatting and other operations so that a visualizer in block 1216 may accept and parse the incoming data. In some cases, the transformations in block 1214 may perform filtering, aggregation, statistical analysis, and other operations that may affect which data are displayed and how the data are displayed.

The visualizer in block 1216 may be part of a user interface 1218 through which a user may view data and control how the data are displayed. One mechanism for controlling how the data may be displayed may be a user interface in block 1220 where a user may create or edit transformations. A user may also be able to store and retrieve the transformations in block 1224 for later use. In many embodiments, a library or selection of several pre-configured transformations may be stored for a user to select and use with or without editing.

The user interface in block 1220 may allow a user to add and edit executable code to define a portion of a transformation. The executable code may be any function description, expression, or other definition that may be compiled, interpreted, or otherwise executed as a transformation.

Once added, a transformation may go through a malware check in block 1226 before being inserted into a processing pipeline in block 1228. A transformation may be identified to be applied prior to storage in block 1206 or after storage in block 1214.

Figure 13:
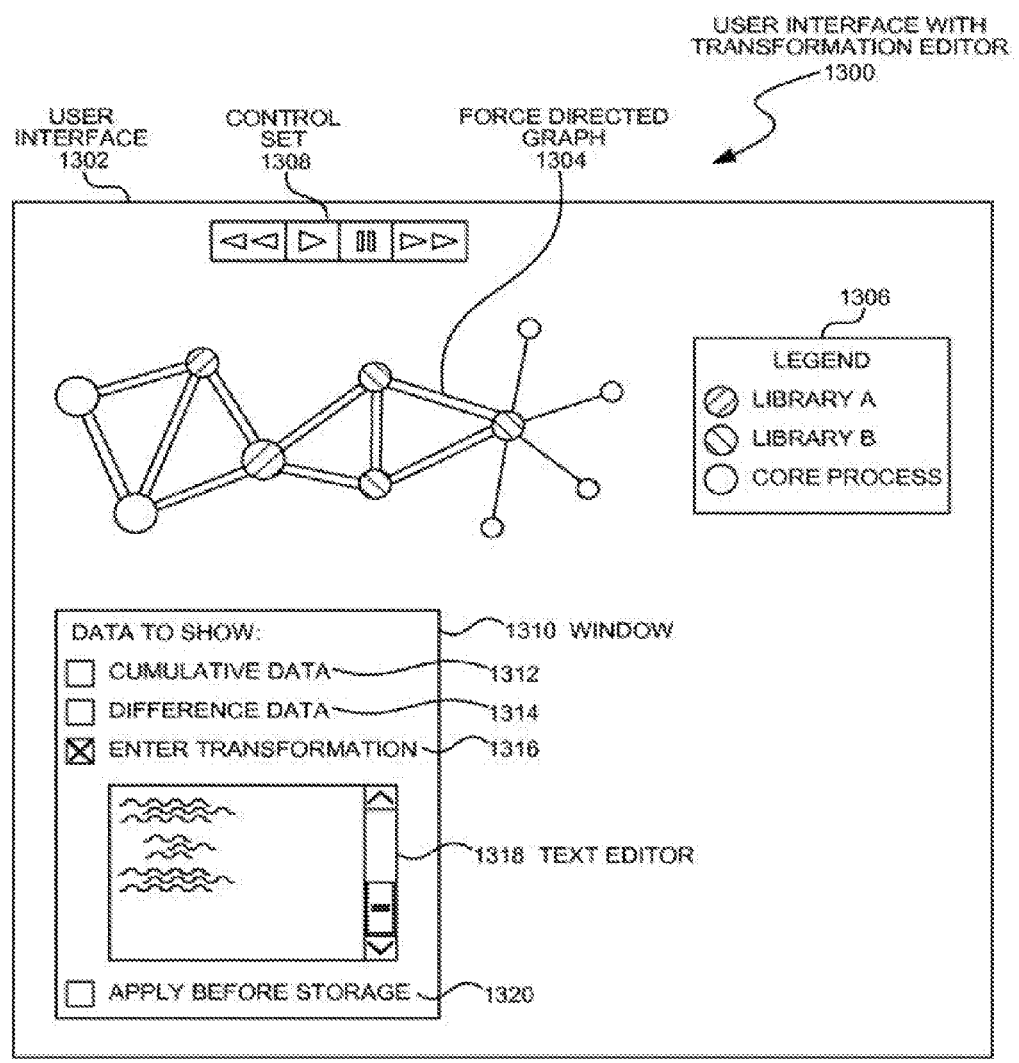
FIG. 13 is a diagram illustration of an embodiment showing a sample user interface with a transformation editor.

FIG. 13 is a diagram illustration of an embodiment 1300 showing an example user interface. Embodiment 1300 may illustrate a user interface through which a user may enter executable code that may be deployed as a transformation.

Embodiment 1300 may illustrate a visualization user interface 1302 that contains a force directed graph 1304, a legend 1306, and a control set 1308. The force directed graph 1304 may display trace data in the form of nodes and edges, where the edges may represent relationships between objects. The legend 1306 may show groups of elements. The control set 1308 may be a set of control buttons through which a user may input playback commands to view different data sets in a time series of trace data.

A window 1310 may be an interface through which a user may select different data to show in the graph. Two different options 1312 and 1314 may reflect pre-defined transformations that may be selected, as well as a third option 1316 where a user may enter and edit an executable expression in a text editor 1318. The user may also select which processing pipeline to implement the transformation in the selection 1320.

The transformations may cause data to be displayed, and sometimes stored, in different manners. The transformations may be defined in an executable language that may be compiled or interpreted to process data. In some cases, the language may enable multiple data elements to be analyzed together. A simple example of which may be to take a difference between two elements.

The transformations may allow a filter to be applied, such as to show tracing data from a specific function or memory object, while eliminating other data. In some cases, the transformations may include an expression, such as to display data from processes that operate for greater than 10 seconds and less than 15 seconds.

An example of pseudo-code for an expression may be:
TABLE-US-00001 on_event (type, data) old_data=fetch (type) new_data=old_data+data put (type, new_data)

The pseudo-code above may be applied to each displayed variable to count each occurrence of the variable for each time slice in the time series. In such a transformation, the displayed data may grow over time.

Because the transformations may include user-supplied code, the transformations may undergo a malware check prior to deployment. The malware check may attempt to catch malicious or malformed transformations so that the transformations may not cause unwanted errors or malicious effects.

Figure 14:
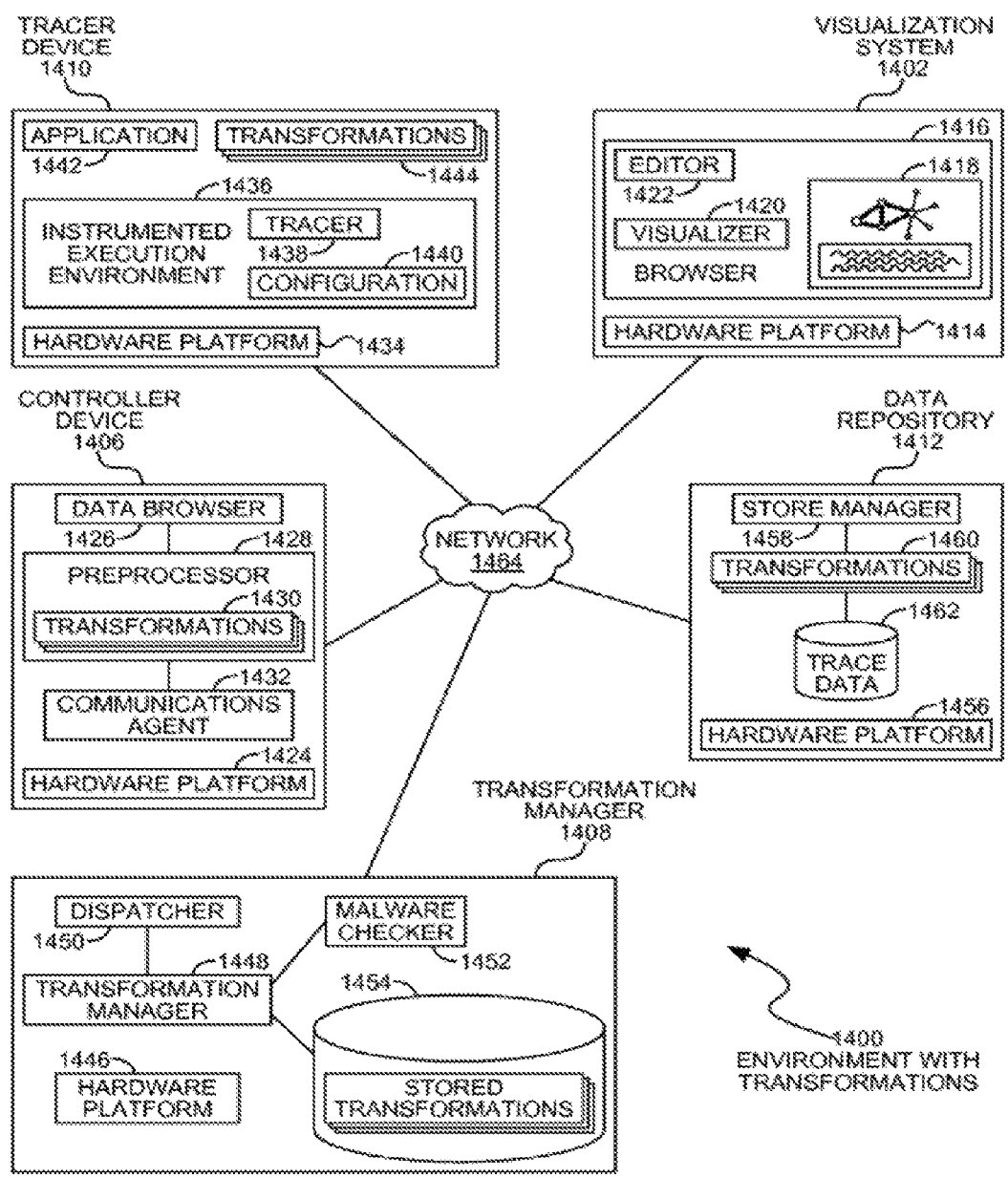
FIG. 14 is a diagram illustration of an embodiment showing a network environment with transformations.

FIG. 14 is a diagram of an embodiment 1400 showing a computing environment that may collect and display trace data in a graph. Embodiment 1400 illustrates hardware components that may deliver the operations described in embodiment 1300, as well as other embodiments.

The diagram of FIG. 14 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Each of the various devices illustrated in embodiment 1400 may have a hardware platform. The respective hardware platforms may be similar to the hardware platform 204. The devices may be any type of hardware platform, such as a personal computer, server computer, game console, tablet computer, mobile telephone, or any other device with a programmable processor.

Embodiment 1400 illustrates a network environment in which transformations may be deployed to modify the operations of data collection, storage, and visualizations. The transformations may be stored and deployed in various contexts and managed through a transformation manager.

The environment may include a visualization system 1402, a controller device 1406, a transformation manager 1408, a tracer device 1410, and a data repository 1412. The visualization system 1402 may provide a user interface for the overall system, and may send commands to the controller device 1406 to provide data for a visualization. The transformation manager 1408 may receive, store, test, and dispatch transformations to various devices. The tracer device 1410 may collect trace data, which may be stored by the data repository 1412.

The visualization system 1402 may contain a hardware platform 1414 on which a browser 1416 may run. The browser may present a user interface 1418 to a user. The browser 1416 may execute a visualizer 1420, which may create and display a graph. The visualizer 1420 may be executable code that runs within the browser 1416 to retrieve data and render a graph. The visualizer 1420 may include animation routines as well as interactive components that may allow a user to interact with the graph.

The browser 1416 may also include an editor 1422 through which a user may enter executable code that may be used as various transformations within the larger system. The transformations may be used by a tracer during data gathering, by a storage manager during data storage, and by a preprocessor when preparing data for visualization. The user supplied code may enable a wide range of customizable options for a user to control how data may be gathered, stored, and displayed. Such control may be useful in scenarios where a user may experiment with different ways of collecting and viewing data.

A controller device 1406 may operate on a hardware platform 1424. A data browser 1426 may be controlled from the user interface 1418 on the visualization system 1402. The data browser 1426 may select data sets to be displayed by the visualizer 1420. Prior to transmitting the data sets with a communications agent 1432, a preprocessor 1428 may apply various transformations 1430 to the data.

A tracer device 1410 may operate on a hardware platform 1434 and have an instrumented execution environment 1436 that may include a tracer 1438. The tracer 1438 may have a configuration 1440 that may define behaviors for the tracer 1438, such as what data to collect and under which conditions the data may be collected.

The tracer device 1410 may also have a set of transformations 1444, which may process the collected data. The transformations 1444 may be applied prior to storing the data and may be used to aggregate, compact, condense, or otherwise prepare the data for transmission to a data repository 1412. The transformations 1444 may also perform data analysis, including various statistical analysis, comparisons, or any other operation.

A data repository 1412 may have a hardware platform 1456 on which a storage manager 1458 may operate. The storage manager 1458 may receive data from various tracer devices and apply transformations 1460 prior to storing the data 1462. The transformations 1460 may perform many different types of operations prior to storage, including aggregation and compaction, as well as summarizing, comparisons, or other operations.

Embodiment 1400 illustrates two locations for applying pre-storage transformations. One location may be at the tracer device 1410 as transformations 1444 and the other location may be at the data repository 1412 as transformations 1460. Either location for transformations may apply changes to the trace data prior to storage. Transformations applied at the tracer device 1410 may apply transformations prior to data transmittal, as such, some of the transformations 1444 may compact the data or otherwise prepare the data for transmittal over the network 1464 to the data repository 1412.

A transformation manager 1408 may operate on a hardware platform 1446 and may include a transformation manager 1448. The transformation manager 1448 may receive transformations from a user through the visualization system 1402, cause the transformations to be dispatched to different devices using a dispatcher 1450. The dispatcher 1450 may communicate with the various devices that execute transformations, transmit the transformations, and cause the transformations to execute under specified conditions.

For example, a dispatcher 1450 may deploy a transformation to the tracer device 1410 to compact data prior to transmission and a second transformation to the data repository 1412 to create summary statistics prior to storing the data. The dispatcher 1450 may make the transformations conditional for tracing a specific application 1442 during a specific time period, then cause the transformations to be turned off.

The dispatcher 1450 may also cause certain transformations to be deployed on the controller device 1406 to prepare, filter, or otherwise modify data that may be displayed in a visualization. In some cases, the transformations 1430 deployed to the preprocessor 1428 may be deployed in near-real time under user control so that data displayed in a visualization may be quickly changed.

The transformation manager 1448 may receive new or edited transformations from a user and then use a malware checker 1452 to determine if the transformation may be incorrect, incomplete, or has the potential to cause harm. The malware checker 1452 may use various tools to approve or deny a given transformation. Such tools may include a virus checker, white list, black list, or other technologies.

The transformation manager 1448 may store transformations in a repository 1454. The stored transformations in the repository 1454 may be made available as selectable options within the browser 1416.

Figure 15:
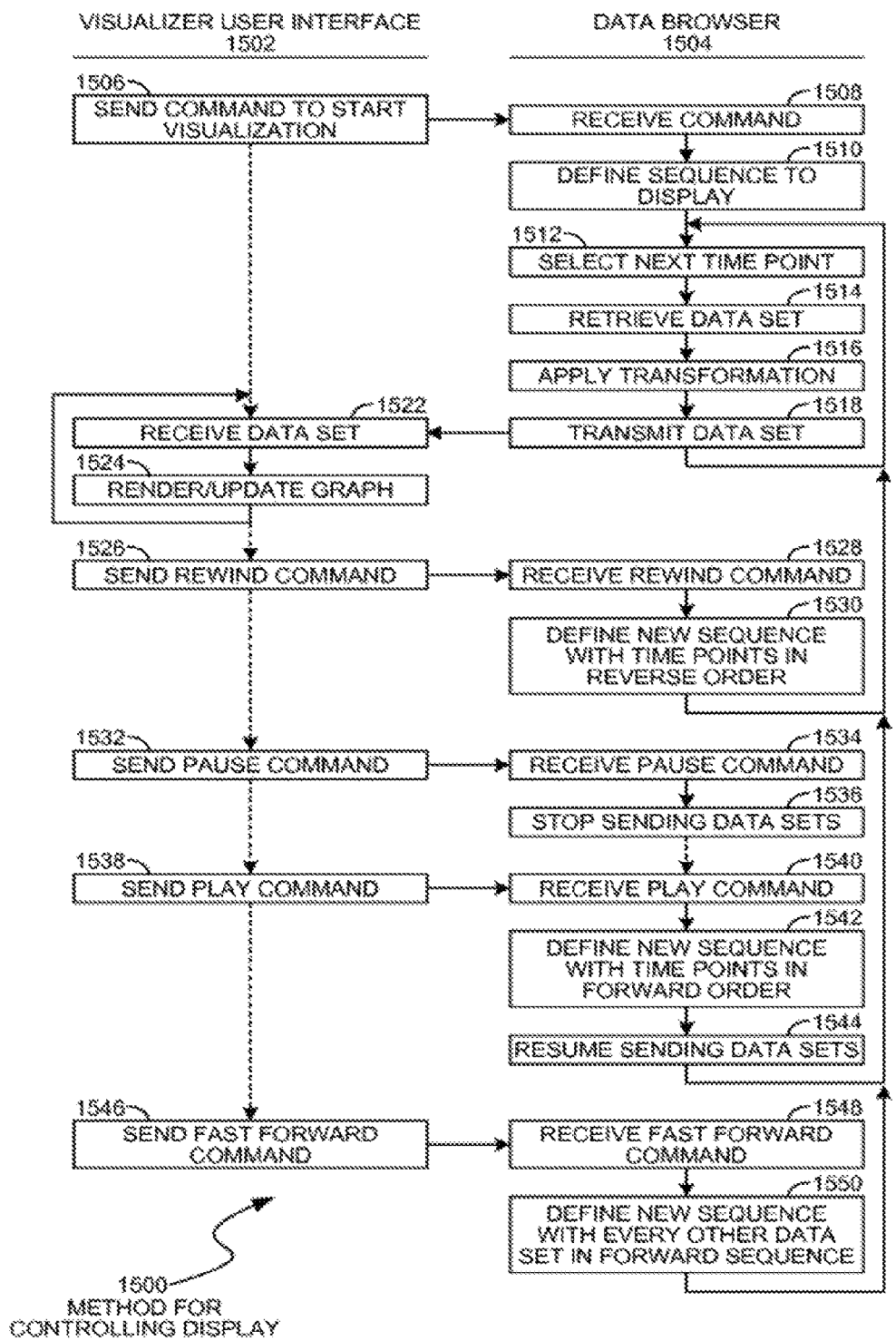
FIG. 15 is a flowchart illustration of an embodiment showing a method for controlling a display using a data browser.

FIG. 15 is a flowchart illustration of an embodiment 1500 showing a method for controlling a visualization for a time series of data sets. Embodiment 1500 illustrates the operations of a visualizer and user interface 1502 in the left hand column and a data browser 1504 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1500 may illustrate a simplified example of the interactions between a user interface 1502 and a data browser 1504, where the data browser may process data sets and present the data sets for visualization. The visualizer may have a data binding or other connection to the data browser such that the visualizer may retrieve and display whatever data sets are being presented.

The data browser 1504 may present data sets in sequence so that the visualizer presents a graph that changes over time. Controls on the user interface may direct the data browser 1504 to present different sequences of data sets for normal playback, reverse playback, fast forward, and other sequences.

Embodiment 1500 illustrates a method where a sequence may be defined for presentation, then the data browser may advance through the sequence to cause data sets to be displayed. In embodiment 1500, the sequences may be normal forward play where the data sets may be displayed in a time sequence, as well as reverse where the sequence of data sets are inverted or reversed, and fast forward where the sequence only shows every other data set such that the graph may be updated twice as fast as normal playback.

Once the sequence is defined, the data browser may use the sequence to look up the next data set, prepare the data set for viewing, and make the data set available to the visualizer. Using a data binding or other connection, the visualizer may gather the data set and update the graph.

In several of the embodiments presented above, a visualizer may operate on one device and a data browser may operate on a second device. In some cases, both the visualizer and user interface 1502 and data browser 1504 may operate on the same device or different devices.

From the user interface 1502, a command may be sent to start visualization in block 1506. The command may be received by the data browser 1504 in block 1508.

The sequence to display may be defined in block 1510. For a normal playback, the sequence may be a time series of data sets in a normal, forward sequence. The next time point to display may be selected in block 1512, and the data set associated with the time point may be retrieved in block 1514. In some cases, the data set may be retrieved from a data repository, which may be a remote device accessed over a network.

After retrieving the data set in block 1514, any transformations may be applied in block 1516 and the data set may be transmitted in block 1518. The process may return to block 1512 to select the next data set in the sequence.

The visualizer and user interface 1502 may receive the new data set in block 1522 and render or update the graph in block 1524. The visualizer may cycle through the loop of blocks 1522 and 1524 each time the data set may be updated by the data browser 1504.

Similarly, the data browser 1504 may loop through the blocks 1512 through 1518 to fetch the next data set in sequence, prepare the data set, and make the data set available for the visualizer. The timing of the loop of blocks 1512 through 1518 may be set to correspond with the real time represented by the data sets and thereby cause the graph to update in the same time frame as the underlying data.

In some embodiments, the loop of blocks 1512 through 1518 may be adjusted faster or slower so that the playback may be increased or decreased in speed. In some cases, the data collection frequency may be much faster than the playback frequency, which may cause the playback to be slower than real time. In other cases, the data collection frequency may be much slower than the playback frequency, causing the playback to be much faster than real time.

At some point, the user interface 1502 may issue a rewind command in block 1526, which may be transmitted to the data browser 1504 in block 1528. The data browser 1504 may define a new sequence with the time points in reverse order in block 1530. The data browser 1504 may return to block 1512 to select the next data set in the sequence. Because the sequence is now reversed, the data browser 1504 may present the data sets in reverse sequence, and each time the data set may be updated, the visualizer may update the graph.

A pause command may be issued from the user interface 1502 in block 1532 and transmitted to the data browser 1504, which may receive the pause command in block 1534. The data browser 1504 may merely stop sending data sets in block 1536 to cause the graph from being updated.

A play command may be issued from the user interface 1502 in block 1538 and transmitted to the data browser 1504, which may receive the play command in block 1540. The data browser 1504 may define a new sequence with the time points arranged in a forward order in block 1542 and resume sending data sets in block 1544, then continue with block 1512.

A fast forward command may be issued from the user interface 1502 in block 1546 and transmitted to the data browser 1504, which may receive the fast forward command in block 1548. The data browser 1504 may create a sequence in block 1550 that has only a subset of the available data sets. In a case where the fast forward may be replayed at twice the normal play speed, the sequence may include only every other data set. The process may return to block 1512 to cycle through the sequence of data sets.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A hardware storage media comprising computer-executable instructions which, when executed on one or more processors, cause the one or more processors to perform a computer-implemented method for using a force directed graph to visualize how messages are passed between computational components, and for using the force directed graph as an input to control a tracer in order to permit trace data to be prepared for display by applying predefined or user-defined transformations to elements of the force directed graph, the computer-implemented method comprising:
    executing an application and gathering message passing data derived from messages passed between compute elements, the message passing data comprising periodic updates transmitted at a predefined interval;
    collecting and storing the message passing data;
    analyzing at least some of the stored message passing data and preparing from the analyzed message passing data a force directed graph comprised of nodes which represent the compute elements, and edges between at least some of the nodes, with the edges representing the periodic updates for the messages as the messages are passed between the nodes at the predefined interval as the application is executed;
    displaying said force directed graph data to visualize how the periodic updates for the messages occur as the messages are passed between the compute elements at the predefined interval during execution of the application;
    inputting one or more transformation definitions for one or more elements of the force directed graph during one or more of the periodic updates visualized for the force directed graph, at least some of said transformation definitions comprising executable code that performs operations on said one or more elements of the force directed graph; and
    displaying said force directed graph as modified by executing said transformation definitions.

2. The computer storage media of claim 1 wherein the computer-implemented method further comprises performing a malware analysis of the executable code for said transformation definitions before executing the executable code for the transformation definitions.

3. The computer storage media of claim 1, wherein inputting one or more transformation definitions is performed at an interface which comprises a set of execution settings.

4. The computer storage media of claim 3 wherein the computer-implemented method further comprises storing said one or more transformation definitions.

5. The computer storage media of claim 4, wherein said interface further comprises a retrieval mechanism to select said stored one or more transformation definitions from a stored set of transformation definitions.

6. The computer storage media of claim 1, wherein displaying said force directed graph comprises animating the force directed graph to show the periodic updates at the predefined interval as the force directed graph is visualized.

7. The computer storage media of claim 2, wherein said malware analysis comprises checking said executable code against a whitelist.

8. The computer storage media of claim 2, wherein said malware analysis comprises checking said executable code against a blacklist.

9. A computing system comprising hardware storage media containing computer-executable instructions which, when executed on one or more processors, cause the one or more processors to configure the computing system with a system architecture that performs a computer-implemented method for using a force directed graph to visualize how messages are passed between computational components, and for using the force directed graph as an input to control a tracer in order to permit trace data to be prepared for display by applying predefined or user-defined transformations to elements of the force directed graph, the system architecture comprising:
    a compute environment that executes an application and gathers with a tracer message passing data derived from messages passed between compute elements of the compute environment, the message passing data comprising periodic updates transmitted at a predefined interval;
    a collector which collects the message passing data and stores the collected message passing data in a database;
    an analyzer that executes a visualizer, and wherein the visualizer performs the following:
        analyzes at least some of the stored message passing data and prepares from the analyzed message passing data a force directed graph comprised of nodes which represent the compute elements of the compute environment, and edges between at least some of the nodes, with the edges representing the periodic updates for the messages as the messages are passed between the nodes at the predefined interval as the application is executed, the directed graph being prepared for presentation at the display to visualize how the periodic updates for the messages occur as the messages are passed between the compute elements at the predefined interval during execution of the application; and
    an interface comprising an input for inputting one or more transformation definitions for one or more elements of the force directed graph during one or more of the periodic updates visualized for the force directed graph, at least some of said transformation definitions comprising executable code that performs operations on said one or more elements of the force directed graph.

10. The computing system of claim 9, wherein the computer architecture performs a malware analysis of the executable code for said transformation definitions before executing the executable code for the transformation definitions.

11. The computing system of claim 9, wherein inputting one or more transformation definitions is performed at an interface which comprises a set of execution settings.

12. The computing system of claim 11 wherein said one or more transformation definitions are stored in a database.

13. The computing system of claim 12, wherein said interface further comprises a retrieval mechanism to select said stored one or more transformation definitions from a stored set of transformation definitions.

14. The computing system of claim 9, wherein displaying said force directed graph comprises animating the force directed graph to show the periodic updates at the predefined interval as the force directed graph is visualized.

15. The computing system of claim 9, wherein said interface comprises an editor that edits said executable code for said at least some transformation definitions.

16. A computing system for using a force directed graph to visualize how messages are passed between computational components, and for using the force directed graph as an input to control a tracer in order to permit trace data to be prepared for display by applying predefined or user-defined transformations to elements of the force directed graph, the computing system comprising:
a memory containing computer executable instructions for a computer-implemented method;
one or more processors which, when executing the executable instructions for the computer implemented method, cause the computing system to perform the following:
execute an application and gather message passing data derived from messages passed between compute elements, the message passing data comprising periodic updates transmitted at a predefined interval;
collect and store the message passing data;
analyze at least some of the stored message passing data and prepare from the analyzed message passing data a force directed graph comprised of nodes which represent the compute elements, and edges between at least some of the nodes, with the edges representing the periodic updates for the messages as the messages are passed between the nodes at the predefined interval as the application is executed;
display said force directed graph data to visualize how the periodic updates for the messages occur as the messages are passed between the compute elements at the predefined interval during execution of the application;
receive as input one or more transformation definitions for one or more elements of the force directed graph during one or more of the periodic updates visualized for the force directed graph, at least some of said transformation definitions comprising executable code that performs operations on said one or more elements of the force directed graph; and
display said force directed graph as modified by executing said transformation definitions.

17. The computing system of claim 16, wherein the computer-executable instruction for the computer-implemented method cause the computing system to further perform the following: perform a malware analysis of the executable code for said transformation definitions before executing the executable code for the transformation definitions.

18. The computing system of claim 16, wherein the one or more transformation definitions are received as input at an interface which comprises a set of execution settings.

19. The computing system of claim 18, wherein the computer-executable instructions for the computer-implemented method cause the computing system to further perform the following: store said one or more transformation definitions.

20. The computing system of claim 16, wherein the computer-executable instructions for the computer-implemented method cause the computing system to further perform the following: animate the force directed graph to show the periodic updates at the predefined interval as the force directed graph is visualized.

* * * * *